July 3, 1956

S. LUTSKY 2,752,723

TRAPS

Filed Jan. 4, 1954

INVENTOR
SIDNEY LUTSKY

BY Weatherford and Weatherford
attys

United States Patent Office 2,752,723
Patented July 3, 1956

2,752,723

TRAPS

Sidney Lutsky, Memphis, Tenn.

Application January 4, 1954, Serial No. 401,924

5 Claims. (Cl. 43—85)

This invention relates to certain new and useful improvements in traps, and particularly in traps adapted for snaring rodents such as mice, rats and the like. One of the principal objections to the trapping of rodents which have existed prior to the present invention has resided in the fact that the carcass of the trapped animal was exposed in an unpleasant and unsightly manner, and the disposal of such trapped animal has required the trapper to come closely into contact with this undesirable object. Additionally, the setting of previously existing traps has been a difficult and sometimes hazardous occupation requiring a great nicety of handling in order to effect latching of the trap bar or similar device in position without injury to the user.

The principal object of the present invention is to simplify the trapping of rodents and to eliminate difficulties in the use of prior existing trap devices.

A further object of the present invention is to provide a box-like housing for the trap mechanism in which a trigger and striker bar is mounted upon a platform slidably and shiftably engaged in the box housing.

A further object of the invention is to provide in a trap device which includes such a box housing, a setting mechanism externally accessible for effecting setting of the mechanism.

A further object of the invention is to provide a trigger mechanism which is automatically positioned for setting; and A further object of the invention is to generally improve the design, construction and efficiency of trap devices.

The means by which the foregoing and other objects of the present invention are accomplished and the manner of their accomplishment will be readily understood from the following specification upon reference to the accompanying drawings, in which.

Figure 1:
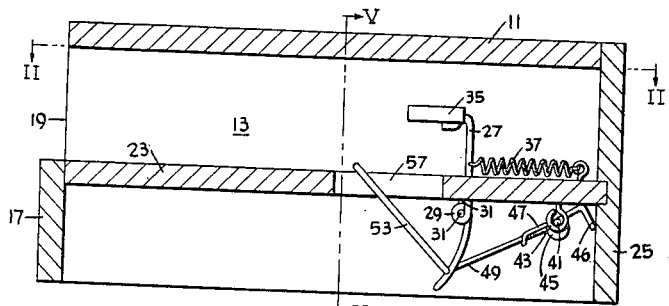
Fig. 1 is a sectional side elevational view taken as on the line I—I of Fig. 2.
Figure 2:
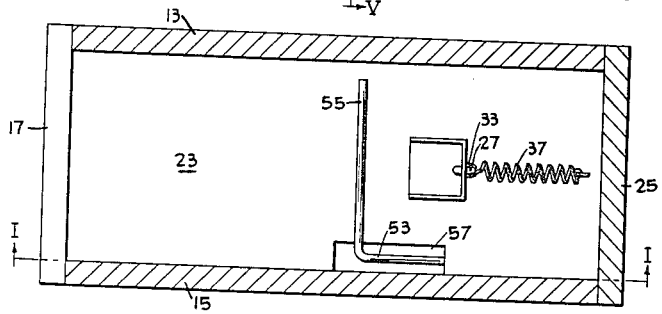
Fig. 2 is a sectional plan view taken as on the line II—II of Fig. 1.
Figure 3:
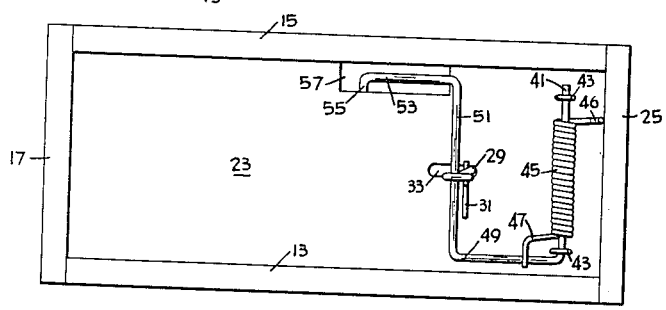
Fig. 3 is an inverted plan view.

Referring now to the drawings in which the various parts are indicated by numerals, the present device comprises an open bottomed box-like housing having a top 11 to which are rigidly fixed opposite side walls 13, 15. The lower portion of the front edges of side walls 13, 15 are joined by a front member 17, the upper edge of which is spaced below top 11 to provide a front access opening 19. Front member 17 and side walls 13, 15 are disposed as vertical members, and top 11 as a horizontal member in normal position of the device. Each of the side walls 13, 15 is provided with a longitudinally disposed groove 21, the forward end of grooves 21 being closed off by the upper portion of front member 17.

Slidably mounted in grooves 21 are opposite side edges of a horizontal platform 23, and to the rear end of platform 23 a vertical back closure 25 is rigidly fixed, closure 25 and platform 23 being shiftable as a unit. Back closure 25 is of size to close off the rear end of the box-like housing and in retracted use position, as shown in Fig. 1, back closure 25 abuts the rear edges of top 11 and side walls 13, 15.

Extending through platform 23 is an upstanding rockable trigger 27, trigger 27 being preferably provided with an eye 29 pivoted upon a bracket 31 carried by and disposed adjacent the underside of platform 23. Trigger 27 extends above platform 23 and the platform is slotted as at 33 to provide for limited rocking or oscillation of the trigger member about its pivotal connection. To the upper end of trigger 27 a bait holder 35 is rigidly fixed, bait holder 35 being preferably provided with upstanding peripheral flanges which are adapted for engaging a suitable bait mounted thereon to retain same against undesired withdrawal. Coupled to the trigger 27 adjacent and above platform 23 is one end of a tension spring 37, the opposite end of which is anchored to platform 23. Spring 37 constantly urges shift of trigger 27 about its pivotal connection to move the bait holder toward back closure 25. Such movement is limited by the rearward portion of trigger slot 33 so as to prevent overtravel of the trigger under action of the tension spring beyond upright position. Below pivot eye 29 the trigger member is preferably bent forwardly and is provided with a notch 39 adjacent its lower end.

A shaft 41 is journalled in suitable bearings 43 mounted adjacent the rear end of the underside of platform 23, the shaft intermediate bearings 43 carrying a coiled spring 45. One end 46 of the coiled spring bears against the underside of platform 23 rearward of shaft 41, and the opposite end 47 of spring 45 bears against an arm 49 integrally coupled at right angles to one end of shaft 41, the arm 49 serving to connect one end of a latch bar 51 to shaft 41. Latch bar 51 extends transversely across the device, and at its opposite end is connected by an upwardly extending arm 53 to a transversely extending horizontal striker bar 55. Preferably platform 23 is cut out as at 57 for reciprocating movement of arm 53 relative to platform 23. The latch bar 51 is adapted to engage the trigger notch 39 for retention of the striker mechanism in set position, and it will thus be seen that coiled spring 45 constantly urges the striking mechanism upwardly by the action of spring end 47 against arm 49, and that as pointed out, the striking mechanism is set and retained against such upward movement by the engagement of latch bar 51 with notch 39.

Figure 4:
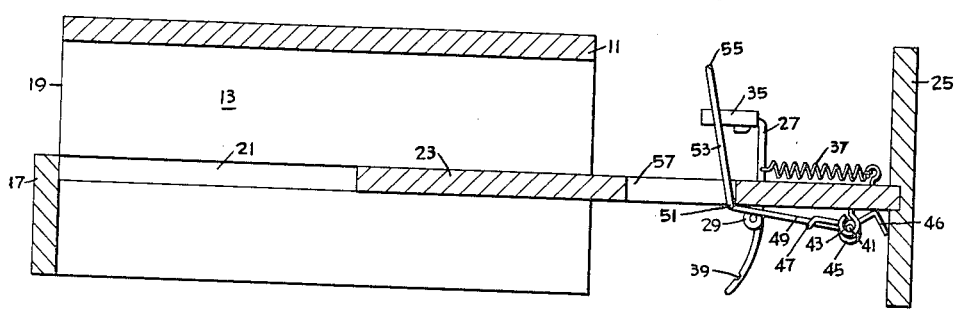
Fig. 4 is a view similar to Fig. 1 with the mechanism carrying platform in extended position.
Figure 5:
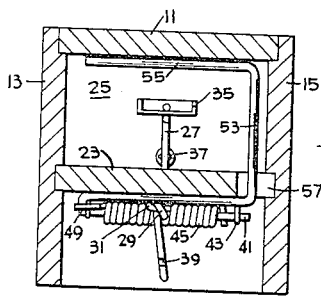
Fig. 5 is a cross-sectional view taken as on the line V—V of Fig. 1.

In the use of the device the platform and back closure may be shifted to the extended position shown in Fig. 4 and a suitable bait placed upon the bait holder 35. The platform may then be returned to the position best shown in Fig. 1 with back closure closing off the rear of the box-like housing, and with access to the upper face of the platform being provided through front access opening 19. With the device thus positioned latch bar 51 may be readily grasped through the open bottom of the housing and quickly moved downwardly into engagement with trigger notch 39, retaining the striking mechanism with the striker bar 55 lying substantially flush with the upper surface of platform 23. With the trap thus set it is believed apparent that an attempt of a rodent or other animal to eat the bait on bait holder 35 will result in a slight forward rocking of trigger 27 about its pivotal connection, such rocking moving the notch 39 rearwardly away from latch bar 51 and releasing the striker mechanism, coiled spring 45 forcing the striker bar 55 upwardly toward the underside of top 11. Such upward movement is effective to engage the animal beneath its head, and generally in its throat area, and swiftly thrust the animal upwardly against the underside of top 11, thus effectively trapping the animal and killing same.

It is found in some instances that the upward thrust by the striker mechanism does not immediately kill the animal, and in some prior constructions animals have been able to pull themselves free from trap bars. It will be seen that by the upward motion of the striker bar of the present device, not only is the lethal blow applied, but also the forelegs and forepart of the body of the animal are lifted away from the platform 23, thus minimizing the possibility of the animal extricating itself from the trap. It will be seen that the animal thus trapped is concealed within the box-like housing, thus avoiding the unsightliness of a trapped carcass, and also providing for handling of the trap and carcass without the necessity of contact with the carcass. The device in its closed condition may be taken to a suitable trash receptacle, and latch bar 51, accessible through the open bottom of the housing, may be drawn downwardly, shifting the striker bar away from top 11, releasing and permitting discharge of the animal carcass while safely segregating the user from the necessity of contact therewith.

It will be seen that the slideways formed by longitudinal grooves 21 are effectively cut off by front member 17, preventing the possibility of improper insertion of the platform and trap mechanism into the housing, and also limiting forward sliding motion of the platform so as to insure proper positioning of the platform within the housing.

It will further be seen that the trigger is automatically positioned for simple resetting by the action of spring 37, disposing the lower portion of the trigger for sure engagement by the latch bar on downward movement and ensuring entrance of the latch bar into the trigger carried latch notch.

I claim:

1. A trap device comprising a housing having a top wall, a platform, a trigger rockably connected to and extending above and below said platform, a bait holder fixed to the upper end of said trigger above said platform, said trigger including a latch notch below said platform, a striker mechanism carried by said platform, said mechanism comprising a latch bar beneath said platform, engageable with said latch notch, said latch bar extending transversely of said mechanism substantially from side to side of said platform, a striker bar overlying said platform and extending transversely substantially from side to side of said platform, an arm at one side of said platform extending between and rigidly connected to one end of said striker bar and one end of said latch bar, spring means urging upward thrust of said striker mechanism, engagement between said latch bar and latch notch setting said mechanism against said thrust, said platform substantially segregating said latch bar and latch from said striker bar, and means slidably supporting said platform in elevated position, in the housing, said striker bar adapted to force an animal caught thereby against said top wall.

2. A trap device comprising a housing having a top wall, a platform in said housing, a trigger rockably connected to and extending through said platform, a bait holder fixed to the upper end of said trigger above said platform, spring means attached to and urging said trigger to upright position, means blocking overtravel of trigger beyond upright position, said trigger including a latch notch below said platform, a striker mechanism carried by said platform, said mechanism comprising a latch bar beneath said platform, engageable with said latch notch, said latch bar extending transversely of said mechanism substantially from side to side of said platform, a striker bar overlying said platform and extending transversely substantially from side to side of said platform, an arm at one side of said platform extending between and rigidly connected to one end of said striker bar and one end of said latch bar, and spring means urging upward thrust of said striker mechanism, engagement between said latch bar and latch notch setting said mechanism against said thrust, said platform substantially segregating said latch bar and latch from said striker bar, said striker bar adapted to force an animal caught thereby against said top wall.

3. A trap device comprising a housing having a top wall, a platform, a trigger rockably connected to and extending through said platform, a bait holder fixed to the upper end of said trigger above said platform, spring means attached to and urging said trigger to upright position, means blocking overtravel of said trigger beyond upright position, said trigger including a latch notch below said platform, a striker mechanism carried by said platform, said mechanism comprising a latch bar beneath said platform, engageable with said latch notch, said latch bar extending transversely of said mechanism substantially from side to side of said platform, a striker bar overlying said platform and extending transversely substantially from side to side of said platform, an arm at one side of said platform extending between and rigidly connected to one end of said striker bar and one end of said latch bar, said platform being cut out at said one side and said arm extending through said cutout within the dimensional limits of said platform, spring means urging upward thrust of said striker mechanism, engagement between said latch bar and latch notch setting said mechanism against said thrust, said platform substantially segregating said latch bar and latch notch from said striker bar, and means slidably supporting said platform in elevated position in the housing, said striker bar adapted to force an animal caught thereby against said top wall.

4. A trap device comprising an open bottomed box-like housing having a top wall, an end access into said housing, a platform slidably mounted in said housing, a trigger rockably connected to and extending through said platform, a bait holder fixed to the upper end of said trigger above said platform, said trigger including a latch notch below said platform, a striker mechanism carried by said platform, said mechanism comprising a latch bar beneath said platform, engageable with said latch notch, said latch bar extending transversely of said mechanism substantially from side to side of said platform, a striker bar adapted to force an animal caught thereby against said top wall overlying said platform and extending transversely substantially from side to side of said platform, an arm at one side of said platform extending between and rigidly connected to one end of said striker bar and one end of said latch bar said platform being cut out at said one side and said arm extending through said cutout within the dimensional limits of said platform, means connecting said mechanism to said platform for swinging movement, and spring means urging upward swinging thrust of said striker mechanism, engagement between said latch bar and latch notch setting said mechanism against said thrust, said platform substantially segregating said latch bar and latch notch from said striker bar.

5. A trap device comprising a top, side walls connected to and depending from said top, an end member rigidly connected to and spanning between the lower portions of end edges of said walls, said top, side walls, and end member forming an open bottomed box-like housing, the upper edge of said end member being spaced below said top to provide end access into said housing, said side walls being grooved from end to end at the level of said upper edge to form slideways, a platform, the sides of said platform being slidably engaged in said slideways, a trigger rockably connected to and extending through said platform, a bait holder fixed to the upper end of said trigger above said platform, spring means attached to and urging said trigger to upright position, means blocking overtravel of said trigger beyond upright position, said trigger including a latch notch below said platform, a striker mechanism carried by said platform, said mechanism comprising a shaft journaled below said platform, a latch bar beneath said platform, engageable with said latch notch, an arm connecting said shaft and latch bar, a striker bar overlying said platform, a second arm extending through said platform at one side thereof and connecting one end of said latch bar with one end of said striker bar, and spring means urging upward thrust of said striker mechanism, engagement between said latch bar and latch notch setting said mechanism against said thrust, said platform substantially segregating said latch bar and latch notch from said striker bar, and said housing concealing said striker bar and said bait holder, said striker bar adapted to force an animal caught thereby against said top.

References Cited in the file of this patent

UNITED STATES PATENTS

| | | |
|---|---|---|
| 282,463 | Lutz | July 31, 1883 |
| 891,880 | Timby | June 30, 1908 |
| 1,462,739 | Champlin | July 24, 1923 |
| 2,169,945 | Eslick | Aug. 15, 1939 |